United States Patent

[11] 3,608,879

| [72] | Inventors | Jacques Birr<br>Paris;<br>Michel Donze, Nancy; Bernard Abel,<br>Epinal, France; Patrice Charbonnier,<br>Pointe Noire, Congo |
|---|---|---|
| [21] | Appl. No. | 805,918 |
| [22] | Filed | Nov. 22, 1968 |
| [45] | Patented | Sept. 28, 1971 |
| [73] | Assignee | L'Air Liquide, Societe Anonyme Pour<br>L'Etude et L'Erploitation des Procedes<br>Georges Claude |
| [32] | Priority | Nov. 23, 1967 |
| [33] | | France |
| [31] | | 129347 |

[54] DEVICE FOR TRIMMING FLASH FROM METAL WHICH HAS BEEN WORKED WITH A MACHINING TORCH
2 Claims, 1 Drawing Fig.

[52] U.S. Cl. .................................................. 266/23 H, 148/9

[51] Int. Cl. ..................................................... B23k 7/02
[50] Field of Search ........................................... 266/23; 148/9

[56] References Cited
UNITED STATES PATENTS

| 2,168,581 | 8/1939 | Pufahl et al. ................... | 266/23 X |
| 2,287,103 | 6/1942 | Jones ............................ | 266/23 X |
| 2,288,027 | 6/1942 | Scheller ........................ | 266/23 X |
| 2,664,368 | 12/1953 | Babcock et al. ............... | 266/23 X |

*Primary Examiner*—Frank T. Yost
*Attorney*—Young & Thompson

ABSTRACT: Oxygen is blown through orifices against the flash resulting from the scarfing when the flash is still hot and can burn in oxygen.

Orifices are provided for the place where the scarfing has started, other orifices for the lateral flash produced during the scarfing pass.

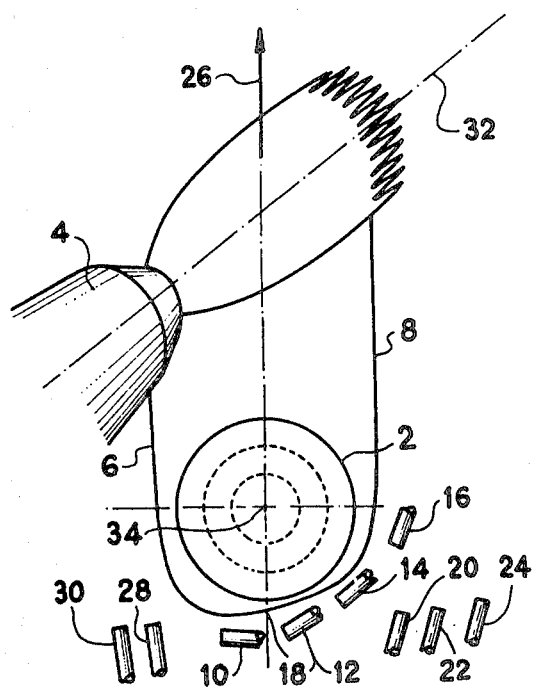

DEVICE FOR TRIMMING FLASH FROM METAL WHICH HAS BEEN WORKED WITH A MACHINING TORCH

The present invention relates to a device for trimming of flash from metal which has been worked with a machining torch, for example a scarfing or cutting torch. It is characterized in that this device comprises one or more orifices through which oxygen is blown on to a flash before the latter has cooled to the point where it can no longer burn in oxygen without preheating.

Preferably, in the case of scarfing, this device comprises orifices having different functions, and distributed as follows:

A group of several orifices directing oxygen onto the portion of flash or burn produced when starting a pass which will not then be removed by the torch effecting the said pass, preferably, the oxygen jets are directed approximately tangentially to the said flash portion.

One or more orifices are arranged laterally of the torch at the side of the pass towards which the torch pushes the metal which will constitute the flash when it is at its normal obliquity relatively to the direction of the pass, these orifices directing the oxygen towards the metal situated on the same side of the pass.

One or more orifices arranged laterally of the torch, at the side of the pass opposite to the foregoing.

Working a metal with a machining took, for example the selective scarfing of a steel slab, is accompanied by the undesirable formation of flashes of molten metals; these flashes are generally observed to occur about the start of the pass and at each side of the pass, chiefly at the side to which the metal is blown by the torch arranged obliquely as is usual.

The formation of flash can be avoided by inclining the treated product, for example the slab, whilst the direction of the pass remains horizontal, which makes the molten metal run laterally. However, this method requires that the support of the slab is adapted to incline the said slab and prevents using certain forms of feeler, a necessary element in the case of automatic selective scarfing. The flash can be destroyed by breaking it by means of a chisel introduced between it and the slab, or with a cutting torch; these two methods are slow and, therefor, reduce the output considerably.

The flash may also be detached by means of a powerful jet of compressed air or water; but in the case of air this method causes the molten metal adhering to the product treated to solidify more rapidly and, in the case of hard or hardenable steels, the use of one of these two fluids or both in association runs the risk of producing cracks.

The device according to the invention permits trimming flash, by burning the flashes as soon as they are formed, at the same time as scarfing is carried out. The flashes at that moment are constituted by a mixture of metal and oxides at a higher temperature than that necessary for initiating the combustion of this mixture in oxygen; a simple system for blowing oxygen through small nozzles is sufficient. In addition to this chemical function, this blowing acts by dividing and repelling the mixture, which promotes its combustion. The oxide obtained forms a nonadhering crust which can be removed with a metal brush, for example.

The delivery of oxygen for trimming depends on the nature of the product worked and the speed of displacement of the product relatively to the torch; high-carbon steels give less flash and, if the speed is reduced, the delivery of trimming oxygen is reduced so as not to attack the product.

The enclosed drawing shows in plan view, diagrammatically and by way of nonlimitative example, the nozzles of a device according to the invention assumed to be seen in plan view from above. What is concerned is the selective torch scarfing of a steel slab, using blowing orifices fulfilling the three functions mentioned hereinbefore.

The scarfing torch nozzle is shown at 2 at the beginning of one of its pass-starting positions, and at 4 when it has effected the scarfing pass comprised between the lines 6 and 8. In position 2, the nozzle is perpendicular to the slab surface; during the remainder of the starting operation, it turns until it becomes parallel to the position 4, the center 34 of the flame impact being displaced only very slightly or not at all. The small oxygen nozzles are fixed to the torch support and therefore do not move when the slab is displaced and not the torch; on the other hand, the torch is displaced in its support at least in order to pass from the starting position to a normal working position.

Four small oxygen nozzles 10, 12, 13, 16 are provided for removing the flash portion produced at the starting operation which will not be removed when the torch carries out the scarfing pass; the line 18 represents the edge of this portion, at the side of the molten bath produced by the starting operation. In plan, these small nozzles are to be tangential to the line 18 or, as in the drawing, offset slightly towards the exterior.

The angle of inclination of the small nozzles is not critical; it may vary from 10° to 70°. Likewise for the other small trimming nozzles, the "angle of inclination" is meant to refer to the angle between the axis of the small nozzle and the surface of the product worked.

Three other small oxygen nozzles 20, 22, 24 serve to destroy the flash at the side 8 of the pass towards which the torch pushes the metal when, as represented at 4, the torch exhibits its normal obliquity relatively to the pass. These small nozzles are shown in their initial position, at the end of the starting stage; there may be any number of these nozzles, but three is the number generally necessary and sufficient to have satisfactory destruction of the flash at the side 8. The oxygen thus blown acts on the flash-forming metal which separated from the pass by the line 8. In the position illustrated, which is very satisfactory, these three nozzles are arranged laterally of the torch and slightly to the rear.

The angle of inclination of these small nozzles is between 30° and 60°; the optimum angle is in the vicinity of 45°. In plan view, the angle of these small nozzles with the direction 26 of the relative displacement between product and torch is comprised between 30° and 50°; the optimum is in the vicinity of 38°. The point of impact on the product of the nearest small nozzle 20 to the axis of the pass is at a distance from the edge 8 of the pass which depends more particularly on the flow rate and pressure of the trimming oxygen; it is generally between 0 and 100 mm.

The device illustrated also comprises two other small nozzles 28, 30 arranged at the pass side opposite from that to which the torch pushes the metal when it is in its normal oblique position. These small nozzles are arranged laterally of the torch. The number two is not obligatory; for example, there could be only a single small nozzle, and even none if it were certain that the axis 32 of the torch will not markedly approach, in plan, the direction 26. In fact, it may be expedient to orientate the torch to make it nearer to the median plane of the pass, for example in order to eliminate a deeper crack portion.

As regards the small nozzles 28, 30, the angle of inclination may vary from 20° to 90° and the angle in plan with the direction 26 from 0° to 70°; these angles are, therefore, not very critical. The point of impact of the nearest small nozzle 28 to the axis of the pass is at 0 to 50 mm. from the edge 6.

The small nozzles are, for example, tubes of red copper which are 10 mm. in internal diameter and are cooled or have sufficient mass to rapidly dissipate the heat which they absorb owing to their proximity to the oxidizing bath. They are supplied with oxygen at a pressure of 1 to 1.5 bar above the ambient pressure and even more if there are considerable pressure losses.

There is no point in supplying the three systems of small nozzles permanently. Supply can be controlled automatically in accordance with the operation of the scarfing torch in accordance with the following program:

Supply to the nozzles 10, 12, 14, 16 begins approximately at the same time as the starting of the pass and terminates with this starting operation, or approximately;

Supply to the nozzles 20, 22, 24 begins when the product begins to be displaced relatively to the torch or slightly, for example one second, after; it terminates when the pass ceases, or slightly after;

The small nozzles 28, 30 are supplied, either at the same time as the nozzles 20, 22, 24 only when the torch is in a less oblique position than its normal position.

The device according to the invention has been described hereinbefore in its application to the scarfing of a steel slab. After modification if necessary, it may be put to other uses, for example, to rough-drill a blind hole at the end of a bar for the production of seamless tubes. This guide hole can be pierced by means of a torch using oxygen and combustible gas, the flash being simultaneously destroyed by oxidation by means of one or more jets of oxygen.

The device described may be modified without departing from the framework of the present invention. For example, it is possible in some cases to dispense with one or two of the groups of small nozzles.

What we claim is:

1. Apparatus for trimming flash from the surface of a metal workpiece, comprising in assembly with each other a machining torch adapted to effect a machining pass in one direction on the surface of a metal workpiece, at least one orifice through which oxygen is blown onto metal flash which forms at at least one side of the path of the torch when the torch is moving in said one direction, said at least one orifice being directed generally in said one direction, and at least one further orifice through which oxygen is blown onto the metal flash which forms when the torch starts a machining pass, said at least one further orifice being disposed on the side of said machining torch opposite said one direction and being directed transversely to said one direction.

2. A method of trimming flash from the surface of a metal workpiece, comprising directing a flame from an ignited machining torch against the surface of a metal workpiece, moving said torch and workpiece relative to each other so that the flame from said torch moves across said workpiece in one direction, directing a stream of oxygen generally in said one direction onto the flash which forms to one side of the path of the flame, and directing a further stream of oxygen in a direction transverse to said one direction onto the flash that forms when the torch starts a machining pass and that forms on the side of said flame opposite said one direction.